United States Patent [19]

Deshais

[11] 4,143,997
[45] Mar. 13, 1979

[54] ELECTROMAGNETIC INDUCTION PUMP FOR MOLTEN METAL INCLUDING IMPURITIES

[75] Inventor: Richard Deshais, Paris, France

[73] Assignee: Novatome Industries, Le Plessis Robinson, France

[21] Appl. No.: 816,989

[22] Filed: Jul. 19, 1977

[30] Foreign Application Priority Data

Jul. 30, 1976 [FR] France .................. 76 23374

[51] Int. Cl.² .............................................. H02N 4/20
[52] U.S. Cl. ........................................................ 417/50
[58] Field of Search ............................ 417/50; 310/11

[56] References Cited

U.S. PATENT DOCUMENTS

| 2,787,219 | 4/1957 | Werner | 417/50 |
| 3,426,967 | 2/1969 | Roberts et al. | 417/50 |
| 3,785,744 | 1/1974 | Carbonnel | 417/50 |
| 3,787,143 | 1/1974 | Carbonnel et al. | 417/50 |
| 3,809,497 | 5/1974 | Carbonnel et al. | 417/50 |
| 3,837,763 | 9/1974 | Ertand et al. | 417/50 |

Primary Examiner—Carlton R. Croyle
Assistant Examiner—Edward Look
Attorney, Agent, or Firm—Sughrue, Rothwell, Mion, Zinn and Macpeak

[57] ABSTRACT

The pump is contained in a refractory block which is plunged into a melt of molten metal to be pumped. An electric current is induced to flow in the molten metal along a straight horizontal conduit in the block and the circuit is closed by the current flowing around the refractory block, within the melt. A magnetic field is induced horizontally at right angles to the current and a net upward pumping force is generated. By having only a part of the electric current circuit inside the refractory block it is relatively easy to clean out slag deposits after prolonged use.

4 Claims, 4 Drawing Figures

ELECTROMAGNETIC INDUCTION PUMP FOR MOLTEN METAL INCLUDING IMPURITIES

FIELD OF THE INVENTION

The present invention relates to an electromagnetic induction pump for molten metal including impurities.

BACKGROUND OF THE INVENTION

Electromagnetic pumps have been known for several years in which the molten metal entering the pumping conduit by "metallostatic" pressure is moved by a force resulting from the combined action of a magnetic field created in a slice of molten metal and of an electric current flowing across the said slice of molten metal perpendicularly to the direction of the magnetic field. Electromagnetic pumps of this type comprise a first magnetic circuit provided with a first gap through which the pumping conduit passes and a second magnetic circuit which induces the current in an electric circuit passing through the said slice of molten metal.

It appears to be particularly advantageous to induce the said electric current in a conductive turn threaded by the second magnetic circuit. It is known that such a conductive turn can be advantageously constituted by a hollow ring filled with molten metal by "metallostatic" pressure when the pump is immersed in a ladle containing molten metal to be pumped. Finally the pump is made immersable by potting its active parts in a block of ceramic material appropriately resistent to all corrosive action of the molten metal and to repeated thermal shocks to which the pump will be subject each time it is put into service and each time it is stopped.

The turn is generally horizontal and closed. It is connected to the pumping conduit at the level of the gap in the first magnetic circuit by two tips or by two electrodes and in such a way that the molten metal flows only in the pumping conduit. In contrast the molten metal stays substantially motionless in the turn while the pump is immersed and in operation.

Experience has shown that when the molten metal contains impurities or dispersed slag, the conductive turn becomes furred after being in operation for some time and that finally it becomes at least partially obstructed which reduces the performance of the pump.

Another type of immersible pump is also known and comprises essentially a magnetic circuit having three vertical columns. The central column includes a gap. The conduit passes through the central column and is horizontally disposed in the gap and adjacent thereto. This conduit has one end in molten metal. The other end is connected to a pumping pipe which is inclined to the horizontal. The molten metal enters the gap by "metallostatic" pressure in the conduit when the pump is immersed and is subjected to the action of the vertical magnetic field formed in the gap of the central column of the magnetic circuit.

Further the conduit is threaded by the magnetic circuit formed by the other two vertical columns. A current is thus induced in the conduit and the loop is closed through the molten metal. Under the combined action of the induced horizontal current and the vertical magnetic field, there appears a force perpendicular to both the induced current and to the vertical magnetic field. This force acts on the slice of molten metal which is contained in the gap and which is thus horizontal. The molten metal is pressurized by this force and it is the indirect action of the pressure which causes the molten metal to rise in the inclined pumping conduit.

This results in the efficiency of a pump of the second pump being fairly low. Further the point where the pumping pipe begins its inclination constitutes an angle where impurities have a tendancy to accumulate without it being very easy to remove them.

Thus to pump metal which includes impurities it has appeared advantageous to use a magnetic circuit structure which is fairly close to induction pumps of the first type combined with a conductive circuit which is open at both its ends in the molten metal and which is closed electrically through the mass of molten metals. By virtue of its accessibility via its ends, this conduit will be very easy to clean in the event of an accumulation of impurities. Further it will be possible to subject the slice of molten metal to a vertical force resulting from the combination of a horizontal induced current and a horizontal magnetic field in the gap of the first magnetic circuit.

Since the conductive circuit is open at both its ends the induced current is closed through the bath of molten metal. It is easy to see that the cross-section of the equivalent turn is thus increased, thereby reducing its resistance in view of the good electrical conductivity of a bath of molten metal.

Further since the turn thus formed remains in permanent contact with the molten metal while the pump is immersed, it is possible to feed the pump by means of this horizontal conduit.

SUMMARY OF THE INVENTION

The present invention provides an electromagnetic induction pump for molten metal, the pump being encased in a block of refractory material which is inert to the action of the molten metal and which is immersed into the molten metal during operation.

The pump comprises a first magnetic circuit including a gap which is threaded horizontally by magnetic flux in operation.

A second magnetic circuit is provided which is closed, and which includes a winding for inducing a magnetomotive force therein.

A first conduit passes through the gap in the first magnetic circuit and rises substantially vertically at least in the immediate vicinity of the gap.

Further, a second conduit which is substantially horizontally disposed, which has its opposite ends opening out in the immersible portion of the refractory block, passes through the first conduit at the gap in the first magnetic circuit substantially at right angles to the flux crossing the gap, and threads the second magnetic circuit, whereby an electric current is induced therein during operation with the electric circuit being closed by the molten metal in which the pump is immersed.

The rising part of the pumping conduit can also begin at the level of the second horizontal conduit, the lower part of the pumping conduit being omitted. The pump is then fed solely by the conductive turn.

Three embodiments of the invention are described by way of example with reference to the accompanying drawings.

DESCRIPTION OF PREFERRED EMBODIMENTS

Figure 1:
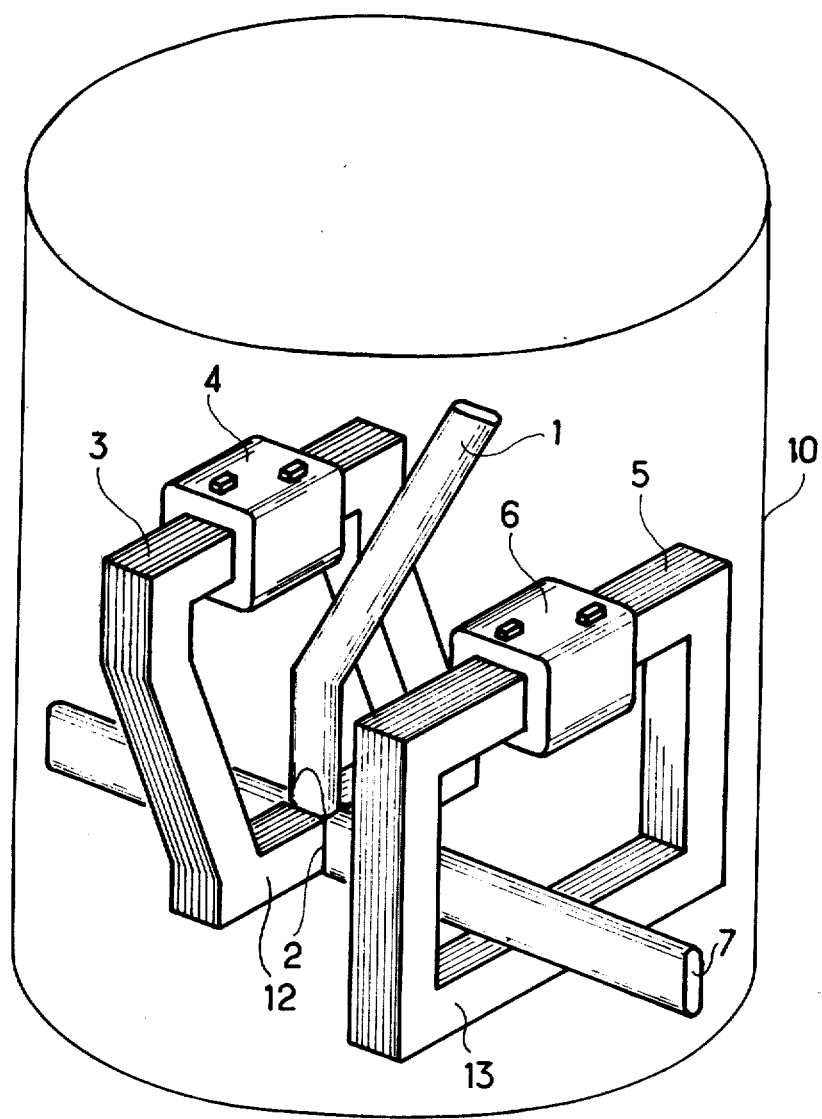
FIG. 1 is a perspective view of a first device embodying the invention.

FIG. 1 is a perspective view of a pump embodying the invention, seen through a block refractory material 10.

The pump includes two magnetic circuits. A first magnetic circuit 3 has a horizontal arm 12 which includes a gap 2. A second magnetic circuit 5 which is entirely separate from the first magnetic circuit comprises a horizontal arm 13 which does not have a gap. As shown in FIG. 1, the second magnetic circuit 5 is disposed in a vertical plane parallel to the horizontal arm 12 of the first magnetic circuit. A winding 6 induces a magnetic field in the second magnetic circuit 5. A pumping conduit 1 passes through the gap 2 of the first magnetic circuit 3 and is disposed vertically adjacent to the gap 2 and therein. Finally a horizontal conduit 7 perpendicular to the arm 12 also passes through the gap 2 so that the horizontal conduit 7 includes a portion which is common with the pumping conduit 1 and which is in communication therewith. The horizontal conduit 7 is surrounded by the magnetic circuit 5 which is perpendicular to it. The horizontal conduit 7 opens at both ends in the immersible part of the block 10. Thus when the pump is in service the conduit 7 is filled entirely with molten metal. The magnetic circuit 5 induces an electric current in the conduit 7, which current completes its circuit through the molten metal. In FIG. 1 a winding 4 induces a magnetic field in the first magnetic circuit 3. This magnetic field passes through the gap in a horizontal direction perpendicular to the conduit 7. The electric current induced by the second magnetic circuit 5 along the conduit 7 is thus perpendicular to the magnetic field in the gap. There will thus be a force in the gap in a vertical direction tending to cause the molten metal to rise up the pumping conduit. The phases of the two windings 4 and 5 are so adjusted as to obtain a maximum pumping effect in the gap 2.

Figure 2:
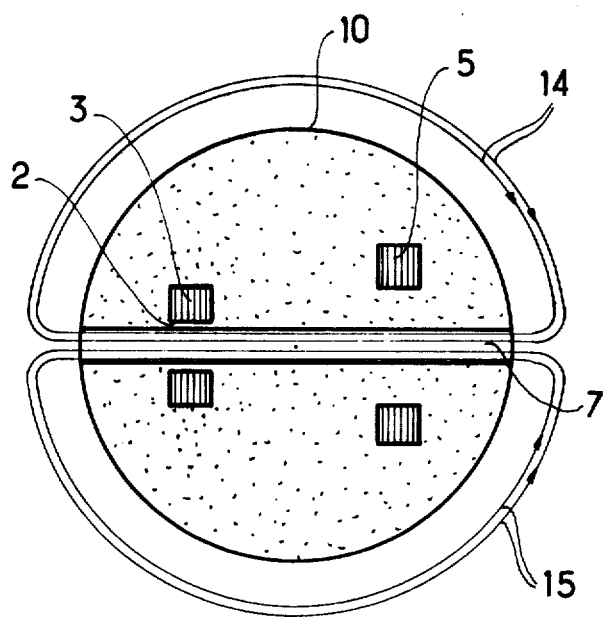
FIG. 2 is a horizontal section through the device of FIG. 1.

FIG. 2 is a horizontal section through the block of refractory material 10 at the level of the gap 2. The straight horizontal conduit 7 has an electric current flowing along it represented by the arrowed curves 14 and 15. This current is induced by the magnetic circuit 5.

When the horizontal conduit 7 has a substantially symmetrical disposition with respect to the refractory block 10 the lines of electric current are divided substantially equally on either side of the refractory block in such a manner as to induce magnetic fields in the first magnetic circuit 3 in opposite directions in each of the two columns of the magnetic circuit 3, these fields combine and assist each other across the gap 2.

Figure 3:
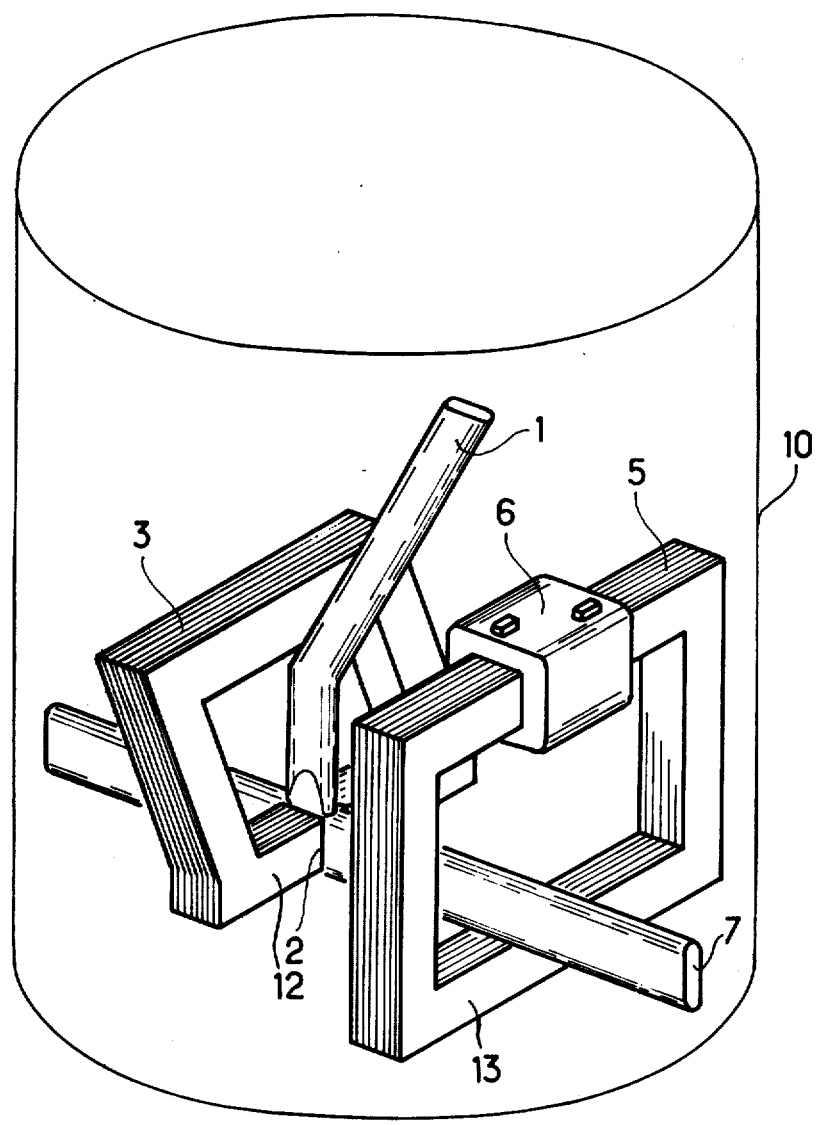
FIG. 3 is a perspective view of a second device embodying the invention.

FIG. 3 shows a pumping device similar to that of FIGS. 1 and 2 but in which the supply winding 4 has been removed. Indeed the current loops 14 and 15 induce a magnetic field in the first magnetic circuit 3 and it may be superfluous to superpose a magnetic field induced by a winding such as 4. The pump is then supplied by only one winding 6 which creates the loop currents which flow through the loop 7 and the bath of molten metal around the pump by the transformer effect. Further, the reluctance of the first magnetic circuit can then be reduced by reducing its length. Such a device provides several advantageous uses. One of which is for a pump for a metal which is very hot which would have a tendency of bringing the entire magnetic circuit 3 near to its Curie point by virtue of its heat, without ever actually going above the Curie point. In such a case it can be advantageous to keep the windings as far as possible from the bath in order to simplify their cooling and it is obvious that it is better to ellongate only one magnetic circuit, especially the one which does not have an air gap, i.e. the circuit 5 whose reluctance increases only slightly with its length.

In this case as in the previous case, the supply of molten metal to the pumping conduit is provided by the horizontal conduit 7. This horizontal conduit is of a straight shape in order to make it easier to remove any deposits which may occur therein. It should be noted that it may be advantageous for the block of refractory material to be symmetrical about a vertical plane passing through its centre and perpendicular to the conduit 7, at least for that part of it which is immersed.

Figure 4:
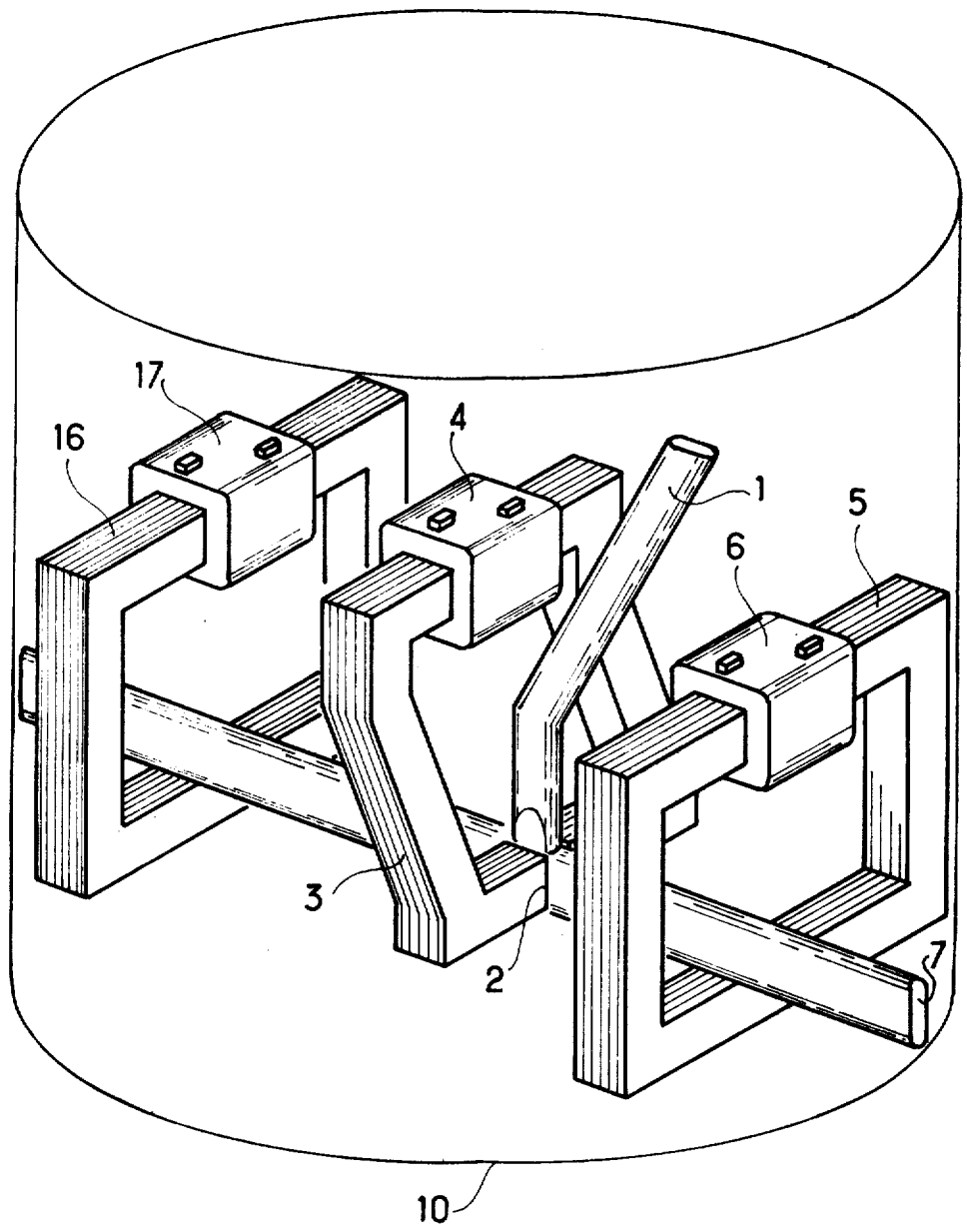
FIG. 4 is a perspective view of a third device embodying the invention and providing a powerful pumping force.

FIG. 4 shows the case where it is desired to reinforce the pumping rate, i.e. the pump pressure. The induced electric current is reinforced by adding a further magnetic circuit 16 which is driven by a winding 17 and also induces an electric current in the conduit 7. The windings 6 and 17 act in phase to induce currents in the conduit 7 which are also in phase and which therefore add arithmetically.

In the devices described above, the pumping conduit 1 is supplied with molten metal by the horizontal conduit 7 into which the molten metal advances under the effect of the "metallostatic" pressure resulting from the fact that this part of the pump is immersed in the bath of molten metal. In certain cases where the slag on the surface of the molten metal is thick enough, it may be advantageous to supply the pumping conduit through the bottom of the refractory block, the pumping conduit then passing through the horizontal conduit from top to bottom.

Naturally although the devices described above appear to be the most advantageous ones known for performing the invention, it will be understood that various modifications can be made to them without going beyond the scope of the invention, particularly when some of the integers are replaced by others which perform the same technical function or which perform an equivalent technical function.

I claim:

1. An electromagnetic induction pump for molten metal including impurities immersible in said molten metal, encased in a block of refractory material which is inert with respect to said molten metal and comprising at least two distinct magnetic circuits and two inter-connecting conduits; said magnetic circuits comprising:

a first magnetic circuit including a horizontal arm provided with a gap, and at least one second magnetic circuit which is closed and provided with a winding for inducing magnetomotive force therein, said two inter-connecting conduits comprising:

a first conduit which passes through said gap in the first magnetic circuit and being substantially vertical in the gap;

a second conduit which is substantially horizontal and opening out of at least one side of the refractory block in the portion thereof which is immersible within said molten metal and passing through the first conduit at the gap in the first magnetic circuit, and being threaded through the second magnetic circuit, bearing an electric current which is induced therein by said second magnetic circuit and whose circuit is completed in the molten metal, the improvement wherein the second, horizontal conduit opens out at both its opposite ends in the immersible portion of the block of refractory material and said second conduit being perpendicular to the horizontal arm of the first magnetic circuit, and wherein said first conduit is open at its lower end to the interior of the second conduit intermediate of its ends and at said gap, such that flow of molten metal by electromagnetic induction causes the molten metal to flow into the interior of the second conduit from both of its opposite ends and to flow vertically upwardly into the lower end of said first conduit at said gap.

2. The electromagnetic induction pump for molten metal including impurities according to claim 1, wherein the first magnetic circuit is provided with a winding for inducing magnetomotive force therein.

3. The electromagnetic induction pump for molten metal including impurities according to claim 1, wherein the first magnetic circuit is shorter than the second magnetic circuit.

4. The electromagnetic induction pump for molten metal including impurities according to claim 1, wherein a first magnetic circuit is provided with a supply winding and two further magnetic circuits are provided with respective supply windings and being arranged to induce additive currents in the horizontal conduit.

* * * * *